United States Patent
Collette et al.

(10) Patent No.: US 8,811,429 B2
(45) Date of Patent: *Aug. 19, 2014

(54) BATCHING AND COMPRESSION FOR IP TRANSMISSION

(75) Inventors: William C. Collette, Stillwater, MN (US); Mark Moran, Woodbury, MN (US); Robert Engebretson, Medina, MN (US); Mike Morandi, St. Paul, MN (US); Brian Johnson, St. Michael, MN (US)

(73) Assignee: Brocade Communications Systems, Inc., San Jose, CA (US)

( * ) Notice: Subject to any disclaimer, the term of this patent is extended or adjusted under 35 U.S.C. 154(b) by 3422 days.

This patent is subject to a terminal disclaimer.

(21) Appl. No.: 10/546,411

(22) PCT Filed: Feb. 19, 2004

(86) PCT No.: PCT/US2004/004959
§ 371 (c)(1), (2), (4) Date: Jun. 14, 2007

(87) PCT Pub. No.: WO2004/075026
PCT Pub. Date: Sep. 2, 2004

(65) Prior Publication Data
US 2008/0095192 A1    Apr. 24, 2008

Related U.S. Application Data (63) Continuation-in-part of application No. 10/368,682, filed on Feb. 19, 2003, now Pat. No. 7,027,450, which is a continuation-in-part of application No. 10/295,359, filed on Nov. 15, 2002, now Pat. No. 7,308,001.

(60) Provisional application No. 60/357,920, filed on Feb. 19, 2002.

(51) Int. Cl.
*H04L 12/28* (2006.01)
*H04J 3/24* (2006.01)

(52) U.S. Cl.
USPC .......................................... 370/474; 370/392

(58) Field of Classification Search
None
See application file for complete search history.

(56) References Cited

U.S. PATENT DOCUMENTS

| | | | |
|---|---|---|---|
| 5,541,911 A | 7/1996 | Nilakantan et al. | |
| 5,758,085 A | 5/1998 | Kouoheris et al. | |
| 6,618,397 B1 * | 9/2003 | Huang | 370/474 |
| 7,027,450 B2 * | 4/2006 | Collette et al. | 370/401 |

(Continued)

*Primary Examiner* — Jutai Kao
*Assistant Examiner* — Kwang Yao
(74) *Attorney, Agent, or Firm* — Wong, Cabello, Lutsch, Rutherford & Brucculeri, L.L.P.

(57) ABSTRACT

A storage router and related method are presented for combining multiple host frames, such as Fiber Channel frames, together into a single datagram for tunneling transmission over an IP or similar network. The storage router operates by storing incoming host frames in a host frame buffer. When there is sufficient data in the buffer, multiple host frames are batched together, compressed, and converted into an IP datagram. The number of host frames to be batched together can be established through a variety of tests, including total bytes of data, number of frames, or through a time-out mechanism. The network layer then fragments the datagram into data link level frames, such as 1500 byte Ethernet frames. When the datagram arrives at the final destination, the segmented datagram is reconstructed, decompressed, and the multiple host frames are then extracted and passed on to the recipient host frame network.

18 Claims, 8 Drawing Sheets

(56) References Cited

U.S. PATENT DOCUMENTS

| | | | |
|---|---|---|---|
| 7,577,337 B2 * | 8/2009 | Itoh et al. | 386/111 |
| 2002/0091834 A1 * | 7/2002 | Isozu et al. | 709/227 |
| 2002/0141451 A1 * | 10/2002 | Gates et al. | 370/503 |
| 2002/0172281 A1 * | 11/2002 | Mantchala et al. | 375/240.12 |
| 2003/0043806 A1 * | 3/2003 | Davis et al. | 370/395.1 |
| 2003/0091000 A1 | 5/2003 | Chu et al. | |
| 2003/0115447 A1 | 6/2003 | Pham et al. | |
| 2003/0142689 A1 * | 7/2003 | Haberman et al. | 370/429 |
| 2003/0193950 A1 | 10/2003 | Philips et al. | |
| 2004/0057444 A1 * | 3/2004 | Brewer et al. | 370/403 |
| 2005/0220110 A1 | 10/2005 | Agarwal | |

* cited by examiner

BATCHING AND COMPRESSION FOR IP TRANSMISSION

This application is a National Stage application of PCT/US04/04959, filed Feb. 19, 2004, which is a continuation in part of U.S. application Ser. No. 10/368,682, filed Feb. 2, 2003, which claims priority to U.S. provisional application Ser. No. 60/357,920, filed on Feb. 19, 2002, and which is a continuation-in-part of U.S. non-provisional application Ser. No. 10/295,359, filed on Nov. 15, 2002.

FIELD OF THE INVENTION

This invention relates to the field of data transmission over communication networks. More particularly, the present invention relates to a system and method for batching a plurality of frames or datagrams into a compressed data segment for transmission over a data network.

BACKGROUND OF THE INVENTION

Computers and other host devices are often connected with one or more storage devices via a storage area network (or "SAN"). It is well known to establish such networks using the Fibre Channel protocol, which is well suited for transmitting storage data over networks due to its ability to carry different networking and channel protocols. For instance, it is possible to transmit channel protocols such as SCSI (Small Computer System Interface) over Fibre Channel links.

The Fibre Channel communications protocol is generally considered to involve five independent layers (Fibre Channel-0, Fibre Channel-1, Fibre Channel-2, Fibre Channel-3, and Fibre Channel-4. Fibre Channel-0 covers the physical characteristics that allow communications over a variety of physical media, such as copper wiring or fiber optics. The Fibre Channel-1 layer defines the 8B/10B transmission coding developed by Widmer and Franasak of IBM. The Fibre Channel-2 layer defines the Fibre Channel framing and signaling protocol. Fibre Channel-3 defines various link service functions. The Fibre Channel-4 level defines the implementation of the different protocols (such as SCSI) that can be carried over the Fibre Channel connection.

Figure 1:
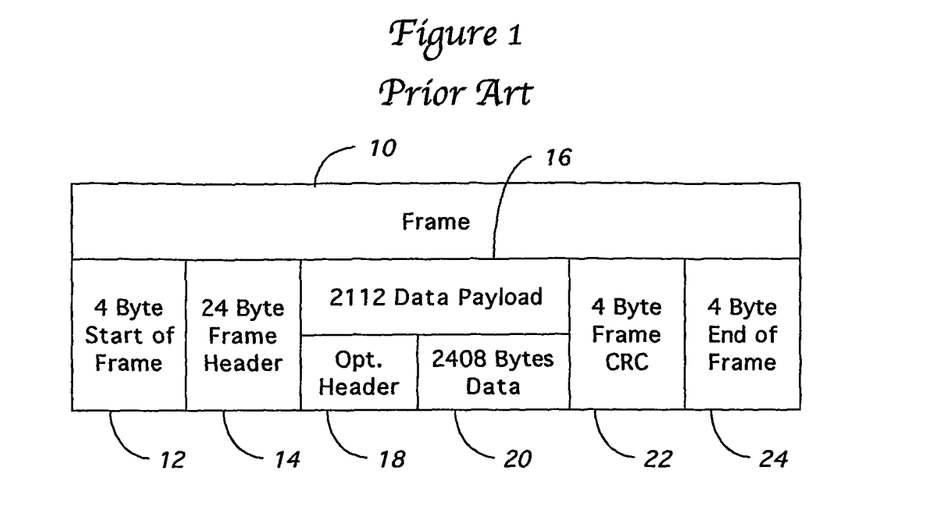
FIG. 1 is a schematic diagram showing elements found within a Fibre Channel frame.

The Fibre Channel-2 layer defines the Fibre Channel frame 10 as shown in FIG. 1. A frame 10 always starts with an ordered set (a specially defined four byte grouping that cannot be mistaken for data) that is known as the start-of-frame delimiter 12. Following this start-of-frame ordered set 12 is a 24-byte frame header 14 that contains basic information about the frame 10, including the type of data being transmitted, a sequence ID, a sequence count indicating the position of frame 10 in the sequence, and an the exchange ID identifying the exchange 40 to which the sequence belongs. After the frame header 14 can be up to 2112 bytes of data payload 16, which contains the actual data being transmitted. In some circumstances, optional headers 18 of up to 128 bytes are included in data payload 16 with along with 1984 bytes of actual data 20. Following the data payload 16 is the frame CRC value 22 and the end of frame ordered set 24. The Fibre Channel-2 layer also defines a Fibre Channel sequence as one or more related frames 10 flowing in the same direction on a link and a Fibre Channel exchange as one or more sequences used to complete a single communication operation.

Fibre Channel based storage area networks are generally limited to campus-sized environments as a result of Fibre Channel's 10 kilometer distance limitation. Recent technology developments have been proposed that would allow these localized SANs to be connected together over Internet protocol (IP) networks. An organization known as the Internet Engineering Task Force (IETF) has helped to develop the specifications for one such technology. This technology, known as Fibre Channel over IP (FCIP or Fibre Channel/IP), enables the tunneling of Fibre Channel data between SANs over IP networks. The FCIP technology relies upon the transport layer (such as TCP) for congestion control and management and relies upon both the transport layer and the Fibre Channel protocol for data error and data loss recovery.

The FCIP specification tunnels Fibre Channel data by embedding each Fibre Channel frame 10 within a single IP datagram. This one-to-one relationship is possible because the maximum size of an encapsulated Fibre Channel frame 10 will not exceed 2148 bytes, while an IP datagram (according to IPv4 as defined in RFC 791) can hold 65535 8-bit bytes (including the 20 bytes that are required for the IP header). Thus, after adding the transport layer and IP headers, the FCIP protocol will turn a stream of maximum-length Fibre Channel frames 10 into a series of 2168 byte IP datagrams. Even if the 40-byte optional IP header is utilized, each IP datagram will be only 2208 bytes in length and hence much smaller than the maximum size allowed for IP datagrams.

Once the IP datagrams are created, they must pass over a physical network utilizing a data link protocol such as ATM, Frame Relay, Ethernet, or IEEE 802.3. In the typical environment, the IP datagrams are divided into Ethernet frames having maximum size 1500 bytes or IEEE 802.3 frames having a maximum size of 1492 bytes. This maximum transmission size for a network is known as the maximum transmission unit or MTU for that network. Datagrams that are larger than the MTU for a network must be divided into MTU sized frames in a process known as fragmentation. Thus, if FCIP creates an IP datagram having a maximum sized Fibre Channel frame 10, this 2168 byte IP datagram will be divided into two separate Ethernet frames to pass over an Ethernet network. One Ethernet frame 60 will contain approximately 1.5 KB of data from the Fibre Channel frame 10 and the other Ethernet frame 60 will contain approximately 0.5 KB of data. Unfortunately, the frame handling overhead required to send each Ethernet frame 60 to its final destination is generally the same even though one of the frames is more than half empty (although the actual transmission time for a half-empty frame is less than the transmission time for a full frame). Thus, the utilization of half-empty Ethernet frames by the FCIP standard reduces the efficiency of the FCIP connection.

Figure 2:
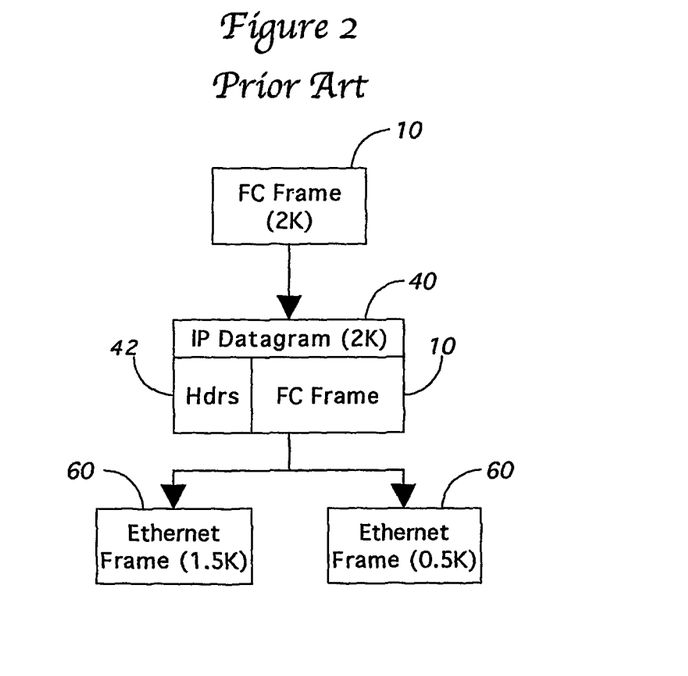
FIG. 2 is a schematic diagram illustrating Fibre Channel frame tunneling in prior art FCIP systems.

FIG. 2 shows the relationship using FCIP between Fibre Channel frames 10, Internet protocol datagrams 40 and data link level frames, such as Ethernet frames 60. The Fibre Channel frames 10 are each embedded into a separate IP datagram 40. This datagram 40 consists of headers 42 created by the transport layer (such as, but not exclusively, TCP) and the Internet protocol in combination, as well as the embedded Fibre Channel frame 10 itself. The IP datagram 40 is then subject to fragmentation when sent over the physical network interface. In FIG. 2, the IP datagram 40 is larger than the MTU of an Ethernet network, and is therefore fragmented into two Ethernet frames 60. The multiple Ethernet frames 60 are then communicated over the physical network and later reassembled into the original IP datagram 40 at the receiving end.

Figure 3:
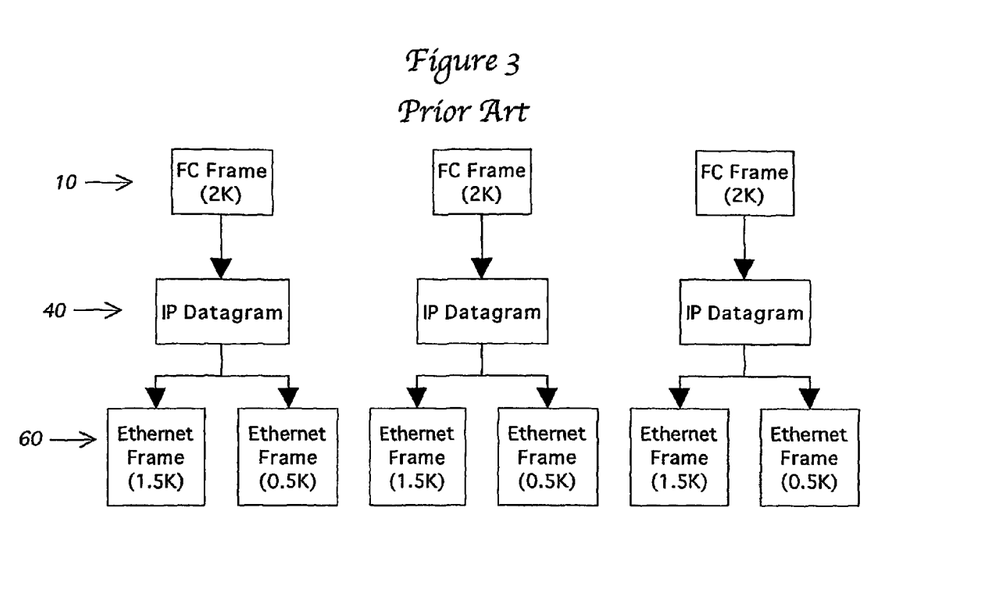
FIG. 3 is a schematic diagram of the prior art FCIP system of FIG. 2 tunneling three Fibre Channel frames into six Ethernet frames.

The inefficiency of using half-empty Ethernet frames 60 can significantly affect network performance, especially in data storage applications where a Fibre Channel sequence includes multiple Fibre Channel frames 10 that contain the maximum 2 KB of data. This situation is shown in FIG. 3, where three consecutive Fibre Channel frames 10 of 2 KB are to be transmitted over an Internet protocol network. Each Fibre Channel frame 10 is embedded into a separate IP datagram 40, each of which in turn is fragmented into two Ethernet frames 60. Hence, a total of six Ethernet frames 60 are required to transmit the 6 KB of data found in the three Fibre Channel frames 10.

What is needed is a way to implement a frame-based protocol such as Fibre Channel over a IP or similar network that fully utilizes the available IP bandwidth.

SUMMARY OF THE INVENTION

The present invention overcomes the limitations in the prior art by providing a technique to efficiently transmit multiple frames of data formatted in a host frame format, such as Fibre Channel or ESCON frames, over an Internet Protocol (IP) or similar network. This is accomplished by batching multiple frames together, compressing the batched frames, and forming a single datagram (or multiple, maximum sized datagrams) from the compressed frames.

The present invention stores received host frames in a buffer memory so that they can be accumulated and handled together in a single batch. The number of host frames to be batched together can be established through a variety of tests, such as total bytes of data, number of frames, or through a time-slice mechanism. The values used for each of these tests can be set through theoretical analysis of a particular network and the compressibility of the data. Alternatively, these values can be set through empirical study of prior performances of the present invention, or can be set dynamically as network characteristics change. These individual tests can be merged into a single algorithm.

Once a batch of data has been accumulated, the present invention compresses the data at or before the transport layer. This allows the transport layer to base its window calculations on the actual amount of the data to be sent across the network, which allows better utilization of the available bandwidth of the connection. In addition, compression at or before the transport layer means that only one trip through the compression process is necessary, even when the transport layer needs to retransmit the data.

After the data is compressed, the transport and network layers add their headers to turned the compressed batch of data into a datagram. The datagram is then fragmented into separate network frames, such as 1500 byte Ethernet frames. When the datagram arrives at the final destination, the segmented IP datagram is reconstructed, the data is decompressed, and the multiple host frames are extracted and passed on to a recipient host frame network.

In one embodiment, the present invention is implemented on a storage router that has a host interface for connecting with the host fabric or channel, such as to an ESCON channel or a Fibre Channel fabric. The storage router also has a network interface for connecting to a datagram network, typically an IP network. Fibre Channel or ESCON frames received over the host interface are stored in a buffer within the storage router until a processor within the router determines that a datagram should be created. A compression object within the invention then compresses the accumulated host frames. The compressed data is then submitted to transport and network layer objects within the storage router, which together create a datagram based on the compressed data, such as an IP datagram. The storage router then transmits the datagram over the network interface via a data link object. Data received from the network interface is likewise stored within a buffer memory until the entire datagram can be reconstructed. Once the data segment is reassembled by the network and transport objects, it is decompressed by a decompression object and converted into one or more host frames to be sent out over the storage router's host interface.

The present invention can also be used to batch multiple IP datagrams. The batch of datagrams are then compressed, with the compressed data being used to form a transport segment. In this way, IP data can be efficiently compressed for further transmission in order to improve the throughput of the IP transmission.

DETAILED DESCRIPTION OF THE INVENTION

Frame Batching

Figure 4:
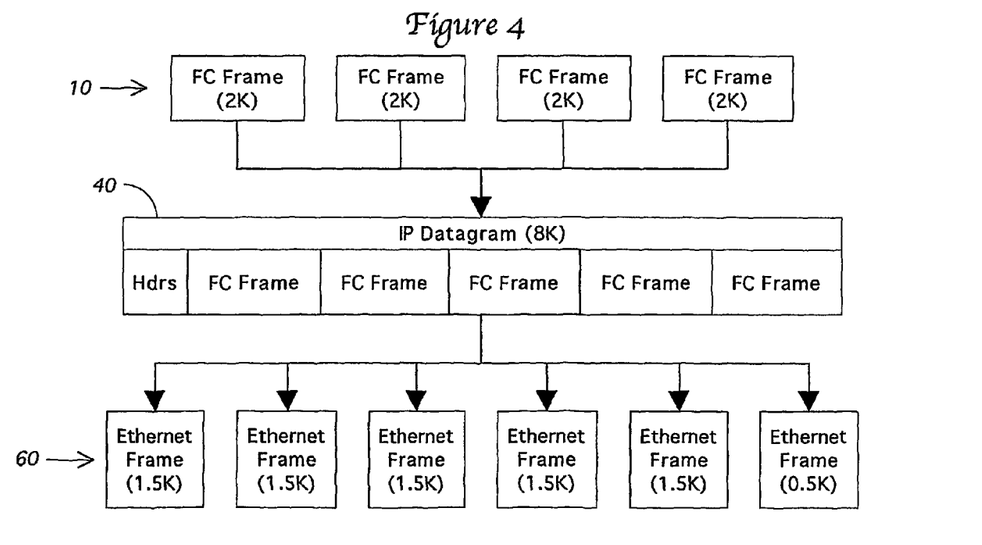
FIG. 4 is a schematic diagram of the present invention utilizing frame batching to combine four Fibre Channel frames into six Ethernet frames.

FIG. 4 shows how the present invention avoids the inefficiency of prior art FCIP implementations through the use of frame batching. In the present invention, it is not necessary to embed each Fibre Channel frame 10 into a separate IP datagram 40. Instead, multiple Fibre Channel frames 10 are stored in a buffer when received and then combined into a single IP datagram 40. Since an IP datagram can contain 65535 bytes according to RFC 791 (IPv4), it would be possible to combine up to 31 2112 byte Fibre Channel frames 10 into a single IP datagram 40, even without compression.

In FIG. 4, four Fibre Channel frames 10 each having approximately 2 KB of data are combined into a single IP datagram 40. Since this datagram 40 contains approximate 8 KB of data, it is necessary to fragment this datagram into multiple Ethernet frames 60. In particular, six Ethernet frames 10 will be used to transmit the 8 KB of data received in the four Fibre Channel frames 10. Thus, even though the sixth Ethernet frame 60 in FIG. 4 is not fully utilized, a clear efficiency is obtained when compared with the prior art technique. In the prior art FCIP system of FIG. 3, six Ethernet frames 60 carry only 6 KB of data, while the present invention of FIG. 4 allows the same six Ethernet frames 60 to carry at least 8 KB of data.

Taking this efficiency further, it would not be unexpected for a single Fibre Channel sequence to contain many hundreds of kilobytes of data being transmitted by numerous Fibre Channel frames 10 each having approximately 2 KB of data. In this situation, the present invention could combine thirty-one of the Fibre Channel frames 10 into a single IP datagram 40. This datagram 40 would then be fragmented into forty-two full 1.5 KB Ethernet frames 60 and one partially full Ethernet frame 60. In contrast, the prior art FCIP implementations would convert those same thirty-one Fibre Channel frames 10 into sixty-two Ethernet frames 60. In this extreme case, the present invention would provide a greater than thirty percent increase in theoretical network efficiency. The real-world efficiency would be slightly less due to the latency involved in accumulating frames for batching.

Real-Time Transport Compression

The efficiency created by frame batching can be increased even further when combined with real-time transport compression. Compression and its counterpart, decompression, is a way of increasing network bandwidth by reducing the amount of data transferred over networks. This means that if data that can be compressed by a 3 to 1 ratio, a 100 Mbs bandwidth IP network is effectively into a 300 Mbs network.

In the present invention, the bandwidth increase from compression is added to the batching efficiency described above. For example, a host computer might send a Fibre Channel sequence of ten 2112 byte frames 10 to a storage router. Assuming an average compression ratio of 3 to 1, this 21120 byte Fibre Channel sequence (plus a nominal number of bytes for Fibre Channel headers) is compressed down to approximately 7040 bytes. The present invention then converts this compressed data into a single IP datagram, which in turn is fragmented into four full 1.5 KB Ethernet frames 60 and one partially full Ethernet frame 60. In contrast, prior art FCIP implementations without compression would convert those same ten Fibre Channel frames 10 into twenty Ethernet frames 60. The net effect is that the over all throughput is increased by approximately 4 times.

In order for the compression of the present invention to operate efficiently, it is crucial for the data compression to occur in real-time at or before the transport layer. Traditionally, compression over a network connection occurs after the transport layer, such as is described in RFC 3173 ("IP Payload Compression Protocol"). By doing compression at or before the transport level, the transport layer's core protocol operates on the compressed data and stores the compressed data in a buffer memory. The compressed data remains in the buffer memory until the data is successfully transferred and acknowledged from the remote transport layer. In this way, if the remote transport layer requests a retransmittal of the data, it will not be not necessary to recompress the data before it is retransmitted. Instead, the already compressed data is retrieved from the buffer memory and retransmitted by the transport layer.

In addition, having the transport layer operate on compressed data improves the frame batching performance of the present invention. Since network datagrams have a maximum size (the maximum size of an IP datagram is 65535 bytes including the IP header), it is necessary to divide data streams that exceed this size into multiple datagrams. If the compression occurs after dividing the data stream into network or Ethernet frames, then each network frame will contain less than its maximum data payload. This is unfortunate, since, as explained above, the overhead for each network frame prevents maximum network efficiency from being maintained unless network frames are transmitted with full data payloads. Similarly, if the compression occurs before dividing into network frames but after the transport and network layers divide the data stream into datagrams, then the individual datagrams will not contain their maximum data payload capacity. Since each datagram also incurs its own overhead (including the transmission of partially full network or Ethernet frames at the end of each datagram), the transmission of partially full datagrams will adversely affect network performance. Only by compressing the data before the transport layer divides the data stream into data segments can the present invention ensure that the data payloads of the datagrams remain as full as possible and thereby maximize network efficiency.

Figure 5:
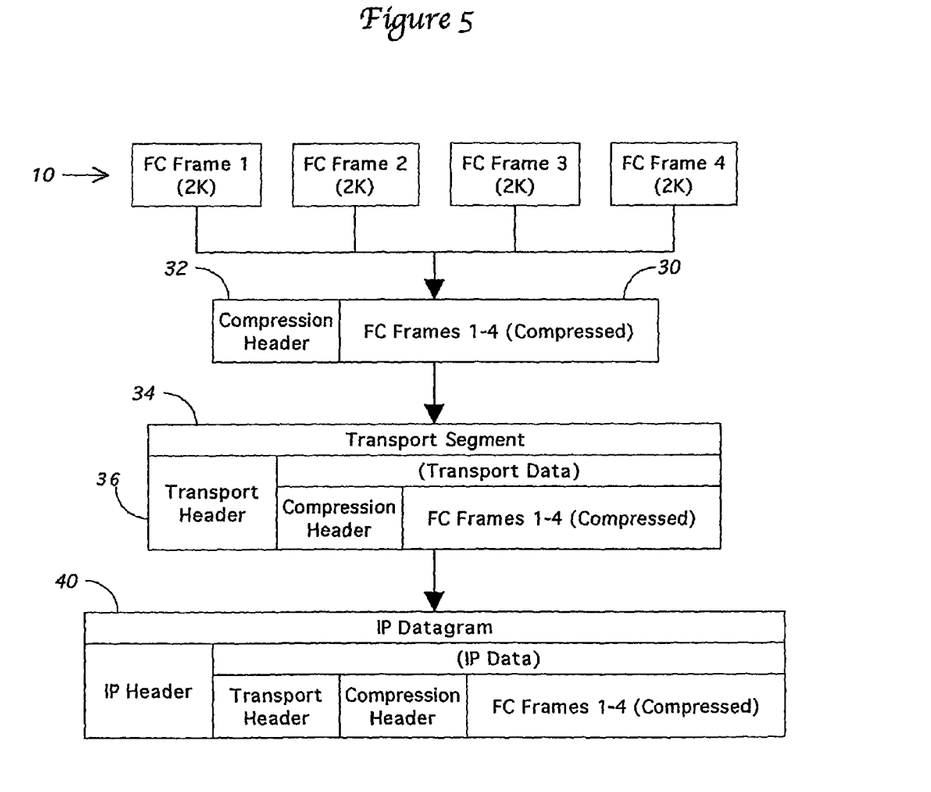
FIG. 5 is a schematic diagram of the present invention showing four host frames being compressed into a single transport layer segment and network layer datagram.

FIG. 5 shows the compression of multiple network frames 10 into a single compressed data batch 30 with a compression header 32. The compression header 32 contains information about the compression of the compressed data batch 30, such as the compressed data size and the uncompressed data size. The compressed data batch 30 and the compression header 32 are then presented to the transport layer. The transport layer then forms one or more transport segments 34 with this data, with each segment 34 having its own transport header 36. Obviously, only one compression header 32 is needed for each compressed data batch 30, even if the header 32 and data batch 30 is divided across multiple transport segments 34. The network layer then forms IP datagrams 40 from the transport segments 34.

Storage Router

Figure 6:
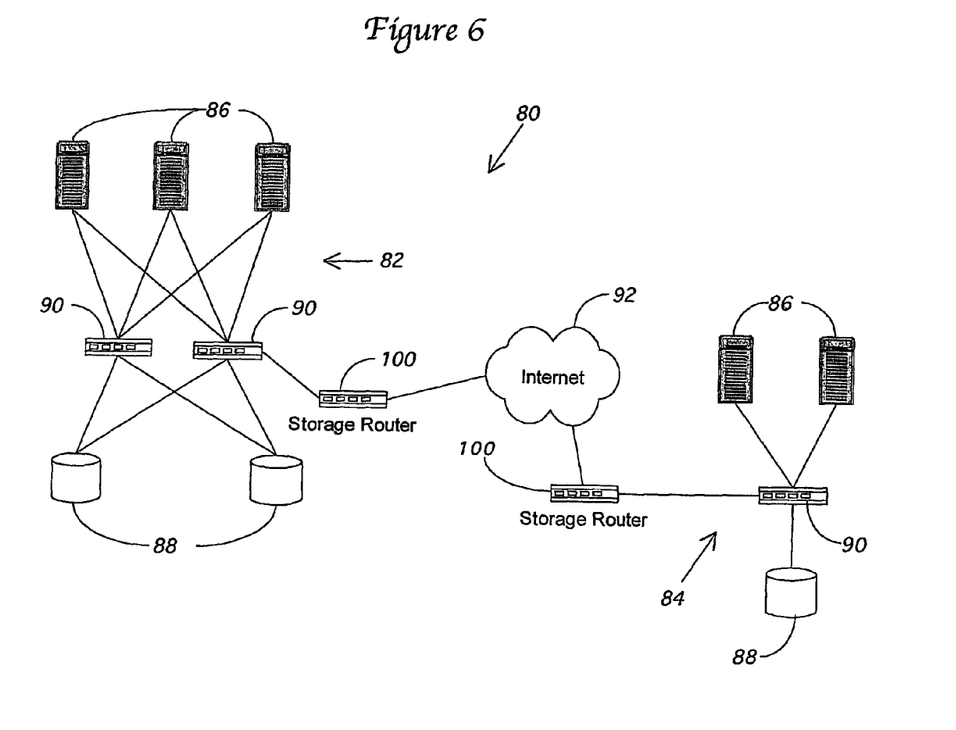
FIG. 6 is a network diagram showing two Fibre Channel storage area networks connected together over an Internet protocol network using two storage routers of the present invention.

FIG. 6 shows a sample environment 80 in which the present invention can be used. Two storage area networks 82, 84 are separately maintained in geographically distant locations. Each SAN 82, 84 is comprised of one or more host computers 86 communicating with storage devices 88 via Fibre Channel switches 90. In SAN 82, redundant Fibre Channel switches 90 ensure a path from each host 86 to each storage device 88 even if one of the switches 90 were to fail. When Fibre Channel hosts 86 and storage devices 88 are connected via Fibre Channel switches 90, as is the case in SANs 82 and 84, the topology is known as a Fibre Channel fabric.

The two Fibre Channel fabrics 82, 84 are connected to each other via an Internet protocol or similar network 92 using a pair of storage routers 100. These routers 100 handle the tunneling of Fibre Channel frames 10 into EP datagrams 40 using the frame batching technology of the present invention.

Figure 7:
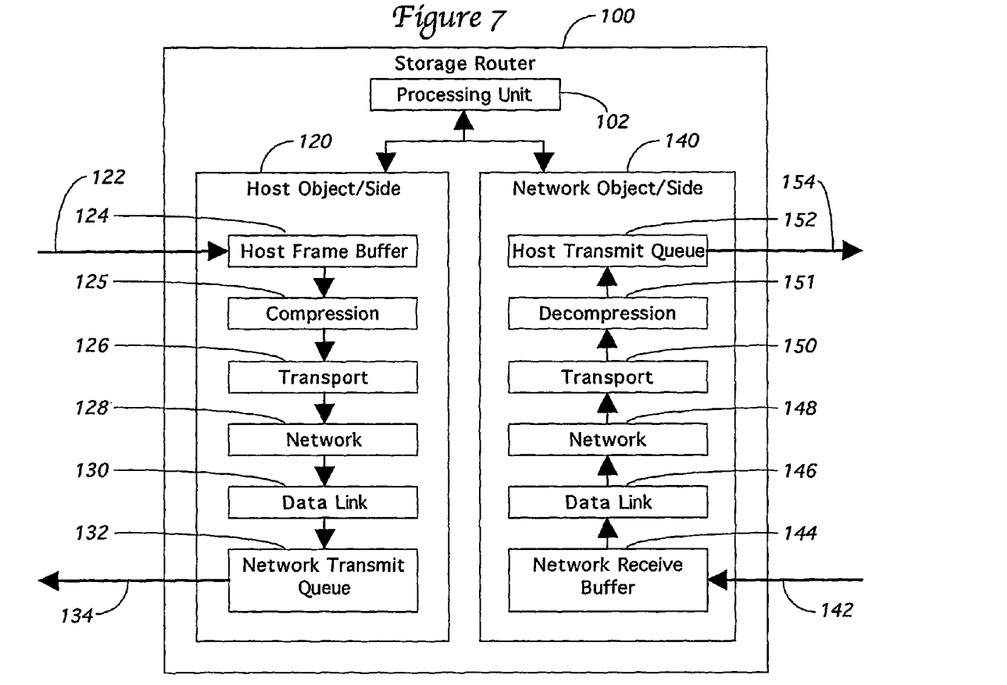
FIG. 7 is a schematic drawing of the logical elements in a storage router of the present invention.
Figure 8:
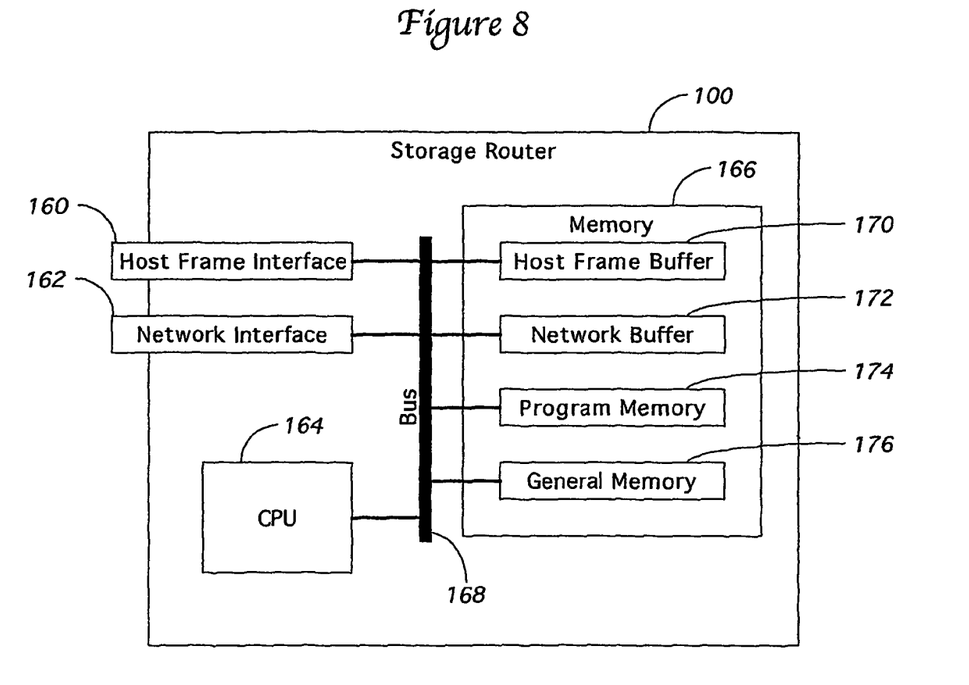
FIG. 8 is a schematic drawing of the major physical components of the storage router of FIG. 7.

The details of storage router 100 are shown in FIGS. 7 and 8. FIG. 7 divides the storage router 100 into two logical halves, a host side or object 120 that handles data received from the Fiber Channel fabric 82, 84 (or another host frame fabric or channel) and a network, side or object 140 that handles data received from the IP network 92. A processing unit 102 in the storage router 100 works with both sides 120, 140 to help control the flow of data. Alternatively, each side 120, 140 could have its own processing unit 102. On the host side 120, the storage router 100 receives the incoming host frames 122 and stores the frames 122 in the host frame buffer 124. Multiple frames 122 are stored in the host frame buffer 124 until an algorithm running on the processing unit 102 determines that sufficient data has been accumulated.

Various techniques can be used to make this determination, such as by accumulating an entire Fibre Channel sequence, counting the number of frames 10 in the buffer 124, totaling the total number of bytes in the buffer 124, monitoring compression ratios of past data, or by accumulating data until a preset time period has expired. Other techniques would be obvious to one skilled in the art and are within the scope of the invention. Ideally, multiple techniques are used in conjunction with one another. One such combination would be to accumulate data until a set number of bytes or frames 10 have been received, while allowing a timer to time-out this waiting period if a predetermined period has expired without reaching the desired amount of data. The number of Fibre Channel frames 10 that are transmitted in any one IP datagram 40 will depend in part upon the number of bytes contained within the Fibre Channel frames 10 themselves, the compressibility of the data, and upon the effective available bandwidth of the network 92. In most cases, higher compressibility and a large network bandwidth allows more Fibre Channel frames 10 to be transmitted through the network 92 in one datagram 40.

Once a sufficient number of Fibre Channel frames 10 has been accumulated in buffer 124, the batch of frames 10 is passed to a compression object 125 that is responsible for compressing the frames 10 and creating a compression header. The compression header generally indicates the original size and the compressed size of the compressed data. It may apply many of the same rules on ordering, compressibility, and non-expansion as described in RFC 3173. A number of different prior art compression techniques that guarantee complete data integrity can be used satisfactorily in the compression object, such as the Lemple-Ziv compression algorithm.

Once the compression object 125 compresses the batch of data and creates a compression header, this information is submitted to the transport object 126. The transport object 126 prepares the data for transmission by prepending a transport header to the compressed data batch, thereby creating a transport segment 34. The segment 34 is then passed to a network object 128, which prepends a network header to create a datagram (such as an IP datagram 60), and then fragments the datagram 60 into the appropriate number of network interface MTU sized packets, and passes them to the data link object 130. The data link object 130 then prepends a data link header on each fragment and queues the packet for transmission on the network transmit queue 132. From here, the data is transmitted out 134 over the IP or similar network 92. The compression object 125, transport object 126, network object 128, and data link object 130 can be actual objects in an object-oriented programming paradigm, or can otherwise exist as software or firmware programming designed to achieve the functions of their respective networking layer.

Data 142 from the network 92 that is received on the logical network side 140 of storage router 100 is placed into the network receive buffer 144. The data 142 is stripped of its data link and network headers by the data link 146, network 148 and transport objects 150, and then decompressed by the decompression object 151. The decompressed data is then passed to the host frame transmit queue 152 for transmission 154 over a frame network or channel such as Fibre Channel fabrics 82 or 84.

FIG. 8 shows the main physical components of storage router 100. Interfacing with the Fibre Channel fabrics 82, 84 or other frame-based channels or networks is the host frame interface 160. This interface 160 contains the hardware and processors necessary for interfacing with the host channel or network. Similarly, communications with the (IP) network 92 is accomplished by network interface hardware 162. These interfaces 160, 162 are in communication with central processing unit 164 (the same as processing unit 102) and storage router memory 166, such as via a communications bus 168. FIG. 8 shows memory 166 containing a host frame buffer 170 and a network buffer 172, as well as program memory 174 and general memory 176. However, it is often advantageous to associate the host frame buffer 170 directly with the host frame interface 160, such as by using separate physical buffer memory in direct communication with the hardware of the host frame interface 160. Similarly, the network buffer 172 may share the separate physical buffer memory of the host frame buffer 170, or it might have its own physically separate buffer memory. While the particular configuration of memories may affect the general performance of moving data into and out of the buffers 170, 172, the actual physical relationship between the buffer memories 170, 172, the interfaces 160, 162, and the other memories 174, 176 is not directly relevant to the frame batching and compression technologies of the present invention.

The processor 164 is responsible for controlling the various components of storage router 100. Specifically, processor 164 is responsible for batching data for compression when sufficient frame data is stored in host frame buffer 170. This is accomplished by having the processor 164 run procedures stored in program memory 174 based upon data and parameters stored in general memory 176. Of course, while FIG. 8 shows a single central processor 164 controlling the storage router 100, it would be possible to divide the operations of this one processor 164 into multiple processors, and to locate certain processors directly on one or both of the interfaces 160, 162. In this way, the determination as to when an IP datagram 40 is to be constructed could be made from within one of the interfaces 160, 162. In addition, it is possible to use the processor 164 to handle the compression and decompression responsibilities of the compression and decompression objects 125, 151. However, it is advantageous to use a dedicated processor to handle all compression and decompression tasks on the storage router 100, since such dedicated processors are often faster at these tasks and since this would free up the main processor 164 on the router 100 for other responsibilities. In the present invention, the main processor 164 and any other processor can take the form of a separate programmable central processing unit (CPU), a dedicated circuit mass-produced for a specific function (such as the ALDC1-20S-HA compression device manufactured by IBM, Armonk, N.Y.), a field programmable gate array (FGPAs), or any logic capable of performing the required tasks.

Method

Figure 9:
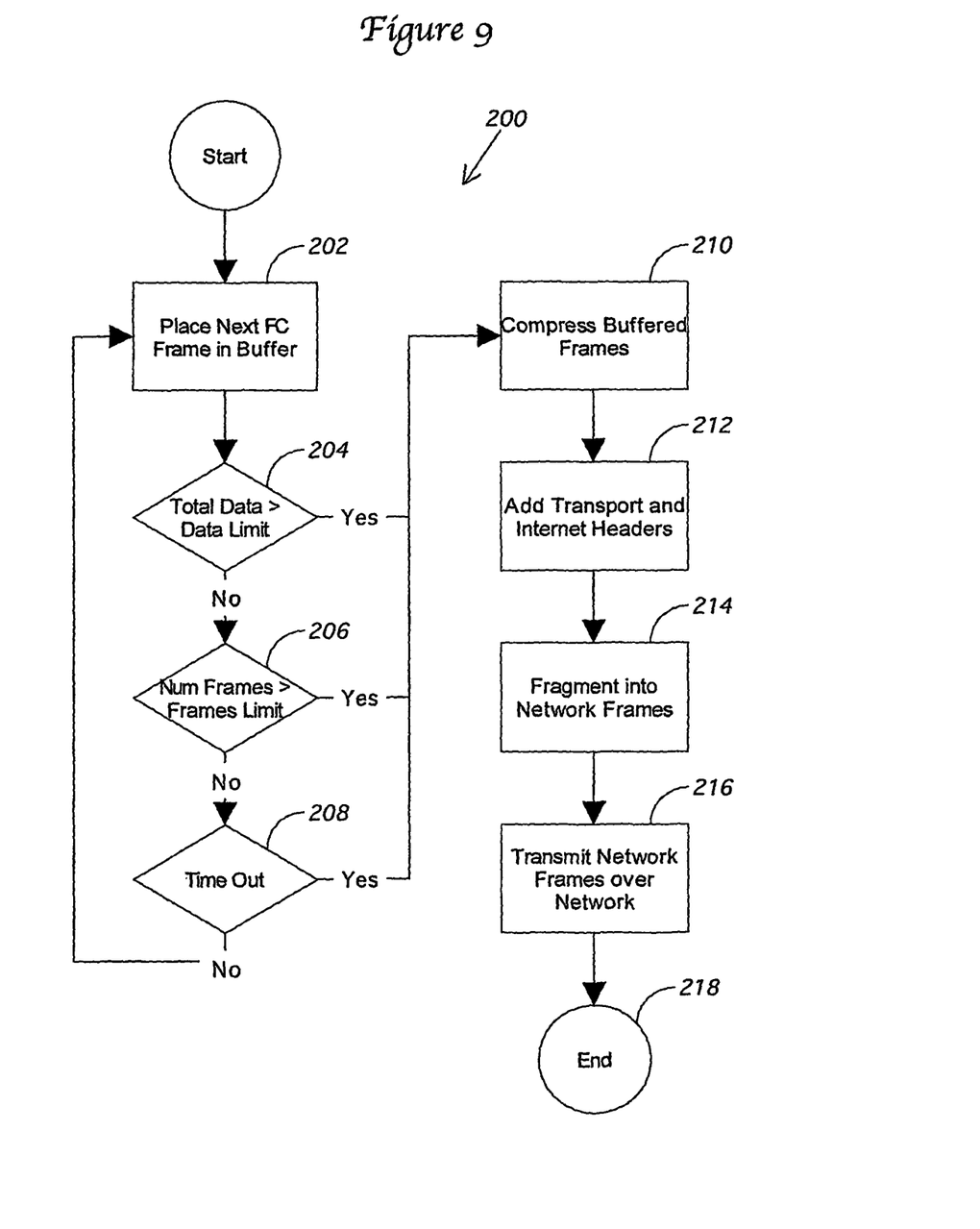
FIG. 9 is a flow chart showing the frame batching process of the present invention.

The method 200 of combining multiple host frames 10 into a single datagram 40 is shown on FIG. 9. The first step 202 of this method 200 is to place a single host frame 10 in the host frame buffer 170. Once this is done, it is necessary to determine whether it is now appropriate to form the IP datagram 40. This is accomplished via steps 204-208. Step 204 determines if the total amount of data in the host frame buffer 170 has exceeded a preset data limit. Similarly, step 206 determines if the number of frames 10 in host frame buffer 170 has exceeded the present frames limit. Finally, step 208 is responsible for determining whether the time out period has been exceeded since the last IP datagram 40 has been created. In the preferred embodiment, the data limit of step 204, the frames limit of step 206, and the time out period of step 208 are determined heuristically based on the actual performance of the IP network 92 and the components of the storage router 100. Each value should be set to maximize the bandwidth utilization of the IP network 92 without significantly increasing data latency. Of course, these steps 204-208 are merely examples of the types of algorithms that might be used to determine when sufficient data has been batched for compression and conversion to a datagram.

If all of these steps 204-208 are calculated to be false, the method 200 simply places the next received frame 10 in the host frame buffer 170 at step 202. If any of these steps 204-

208 calculates to a true value, the method 200 continues at step 210 by compressing the frames 10 in host frame buffer 170. The step of compressing the frames 10 will generally include the step of creating a compression header for the compressed frames 10. Step 212 then adds the transport and Internet protocol headers to the compressed frames 10. The resulting datagram is then fragmented into multiple network (or data link) frames 60 in step 214 according the MTU of the physical network. The network frames 60 are then transmitted over the network 92 at step 216. The method 200 of creating a single datagram ends at step 218, but in practice the method 200 will simply start over again repeatedly at step 202.

The above description implies that the host frame buffer 170 is emptied each time the buffered frames 10 are compressed in step 210. This is not a requirement of the present invention, as it would be a simple manner to simply place all incoming host frames 10 into the buffer 170, and then use steps 204, 206, and 208 to determine which subset of the frames 10 in buffer 170 are to be compressed together in step 210. The above description also implies that only a single datagram is created from each batch designated by steps 204-208. However, the batch may be sufficiently large that multiple datagrams can be created from a single batch. By compressing the batch of data before the transport and network layers divide the data into datagrams in step 212, the present invention ensures that only the last datagram will contain less than a full data payload.

The method for receiving data over the Internet protocol network 92 is essentially the reverse of method 200. Multiple network frames 60 are accumulated to recreate the IP datagram 40. Once the datagram 40 and segment 34 is reconstructed, the individual frames 10 are extracted from the datagram 40 and sent out over the host frame network 82, 84.

Alternative Embodiment

Figure 10:
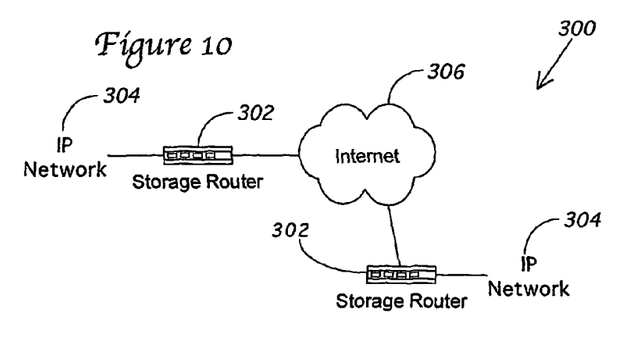
FIG. 10 is a network diagram showing two Internet protocol networks connected over another Internet protocol network using two alternate embodiment storage routers of the present invention.

FIG. 10 shows the present invention in use in an alternative environment 300. In this environment 300, two storage routers 302 connect two different IP networks 304 over a separate IP network 306 (the Internet). This is similar to the environment 80 shown in FIG. 6, except that routers 100 in FIG. 6 connect two Fibre Channel fabrics 82, 84 that used Fibre Channel frames, as opposed to the IP networks 304 of environment 300 that use IP datagrams. The batching and compression performed by the present invention are equally useful in both environments 80, 300.

Figure 11:
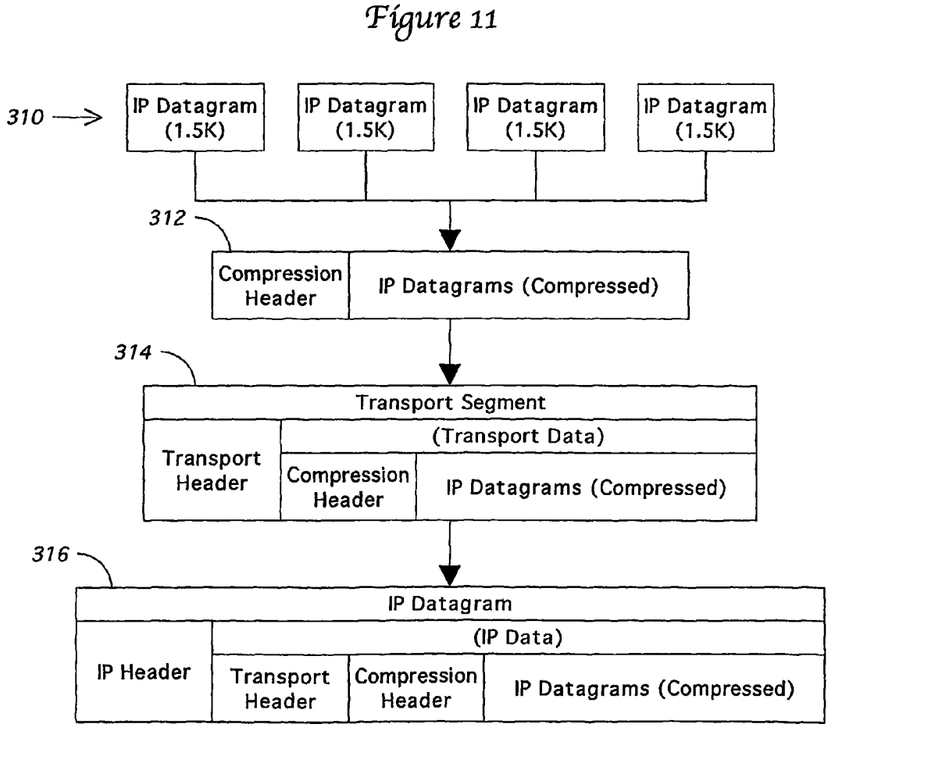
FIG. 11 is a schematic diagram of the present invention showing four Ethernet frames being compressed into a single transport layer segment and network layer datagram.

This utility is exemplified in FIG. 11. This Figure is very similar to FIG. 5, except that the 2K Fibre Channel frames 10 of FIG. 5 have been replaced with 1.5K IP datagrams 310. In the example of FIG. 11, these four datagrams 310 are combined together and submitted to a compression engine, which compresses the datagrams and adds a compression header 312. This is then converted to a transport segment 314 by adding a transport header, which then is used as the data in an IP datagram 316.

By compressing multiple datagrams of IP data before the transport layer, the same advantages are reached as described above. For example, assuming a 2:1 compression ratio, the compression technique of RFC 3173 would compress four 1.5K datagrams into four compressed 0.75K frames, as opposed to the two 1.5K compressed frames of the present invention. If you consider IP datagrams that are smaller than 1.5K, the advantages are even greater. For instance, a series of datagrams might be of the following sizes: 1K, 1.5K, 0.5K, 1K, 0.25K, 0.25K, and 1.5K. Again assuming a 2:1 compression ratio, the RFC 3173 standard would produce seven separate frames each being half of their original size, while the present invention would submit these datagrams to the compression engine as a single 6K submission, resulting in the compressed data being transmitted in two 1.5K frames.

The invention is not to be taken as limited to all of the above details, as modifications and variations may be made without departing from the spirit or scope of the invention. For instance, the above explanation described the storage router of the present invention in connection with Fibre Channel frames of a maximum size of approximately two kilobytes. In some environments, Fibre Channel frames are created with a lower maximum size, such as one kilobyte. The present invention is equally useful in this environment, since the prior art FCIP implementations would create a separate IP datagram 40 for each Fibre Channel frame 10. Although there would be no fragmentation in this environment since each IP datagram 40 would be less than the MTU of an Ethernet network, each Ethernet frame 60 would carry less than its maximum data payload (approximately 1 KB instead of 1.5 KB). With the present invention, multiple 1 KB Fibre Channel frames 10 would be combined into a single IP datagram 40, which would then be fragmented as necessary for the network's MTU as is shown in FIG. 4. In this way, most of the Ethernet frames 60 would carry their maximum data payload, thereby increasing the efficiency of the network.

In addition, the above description was generally made in connection with a storage router connecting a Fibre Channel network or fabric to an Internet Protocol network. While this is currently the preferred embodiment, the present invention would work equally well in transmitting other frame-based protocol communications, such as from an ESCON channel, over IP-like networks.

The above description also showed a specific logical and physical division of components in the storage router. It would be well within the scope of present invention to alter the logical and physical divisions of these components without altering the fundamental process of the present invention. Also, the method of Figure shows three particular tests being used to determine when the host frames 10 in host frame buffer 170 are to be compressed and combined into a datagram 40. One or more of these tests could be removed or altered, or additional tests could be added to the method and still be within the contemplated scope of the present invention. As the above examples illustrate, the invention should not be limited by the specifics of the above description, but rather should be limited only by the following claims.

What is claimed is:

1. A method for transmitting host frames from a first host frame network to a second host frame network over a datagram network comprising the steps of:
   a) creating a batch of frames consisting of a plurality of host frames received from the first host frame network;
   b) compressing the batch of frames to create a compressed batch of frames with a single compression header;
   c) forming a transport segment from the compressed batch of frames;
   d) forming a datagram from the transport segment; and
   e) transmitting the datagram over the datagram network.

2. The method of claim 1, further comprising
   f) receiving the datagram from the datagram network;
   g) extracting the compressed batch of frames from the datagram;
   h) decompressing the compressed batch of frames back into the batch of frames; and
   i) transmitting the plurality of host frames in the batch of frames over the second host frame network.

3. The method of claim 1, wherein the datagram network is an IP network, and the host frame networks are Fibre Channel networks.

4. The method of claim 1, wherein the datagram network is an IP network, and the host frame networks are ESCON channels.

5. The method of claim 1, wherein the datagram network is an IP network, the first host frame network is a Fibre Channel network, and the second host frame network is an ESCON channel.

6. The method of claim 1, wherein the transport segment is formed by a local transport layer, and the local transport layer stores the compressed batch of frames in a buffer for retransmission when retransmission is desired by a remote transport layer.

7. The method of claim 1, wherein the step of creating a batch of frames further comprises storing the plurality of host frames in a host frame buffer.

8. A method comprising the steps of:
   a) creating a batch of frames consisting of a plurality of host frames received from a first host frame network;
   b) compressing the batch of frames to create a compressed batch of frames;
   c) forming a transport segment from the compressed batch of frames;
   d) forming a datagram from the transport segment; and
   e) transmitting the datagram over a datagram network,
   wherein the step of creating a batch of frames further comprises storing the plurality of host frames in a host frame buffer and combining the host frames received in the host frame buffer into the batch of frames when triggered by an algorithm.

9. The method of claim 8, wherein the algorithm tracks the number of host frames received since the previous batch of frames was created and triggers the creation of a batch of frames when the number of host frames received exceeds a frames limit value.

10. The method of claim 9, wherein the frames limit value is set heuristically to maximize data throughput over the datagram network.

11. The method of claim 9, wherein the frames limit value is set heuristically to balance maximizing data throughput over the Internet protocol network without significantly increasing data latency.

12. The method of claim 8, wherein the algorithm tracks the amount of time since the previous batch of frames was created and triggers the creation of a batch of frames when the amount of time exceeds a time limit value.

13. The method of claim 8, wherein the algorithm tracks the total amount of data stored in the host frame buffer since the previous batch of frames was created and triggers the creation of the batch of frames when the tracked amount of data exceeds a frames limit value.

14. A method for compressing IP datagrams comprising the steps of:
   a) creating a batch of at least two IP datagrams;
   b) compressing the batch of IP datagrams to create a compressed batch with a single compression header;
   c) forming a transport segment from the compressed batch;
   d) forming at least one new datagram from the transport segment; and
   e) transmitting the new datagram.

15. A method comprising the steps of:
   a) creating a batch of frames consisting of a plurality of host frames received from a first host frame network;
   b) compressing the batch of frames to create a compressed batch of frames with a single compression header;
   c) forming a transport segment from the compressed batch of frames;
   d) forming a datagram from the transport segment; and
   e) transmitting the datagram over a datagram network.

16. The method of claim 15, further comprising
   f) receiving the datagram from the datagram network;
   g) extracting the compressed batch of frames from the datagram;
   h) decompressing the compressed batch of frames back into the batch of frames; and
   i) transmitting the plurality of host frames in the batch of frames over a second host frame network.

17. The method of claim 15, wherein the datagram network is an IP network, and the host frame networks are Fibre Channel networks.

18. The method of claim 15, wherein the transport segment is formed by a local transport layer, and the local transport layer stores the compressed batch of frames in a buffer for retransmission when retransmission is desired by a remote transport layer.

* * * * *